July 5, 1932.  E. SEARS  1,865,446
WEIGHING DEVICE
Filed Oct. 30, 1930
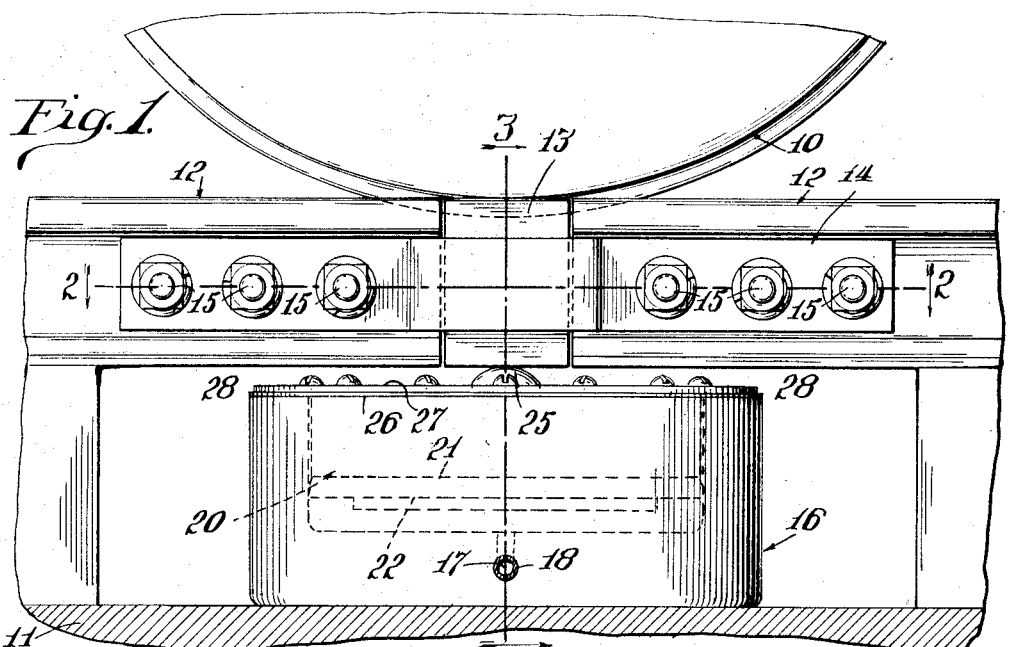
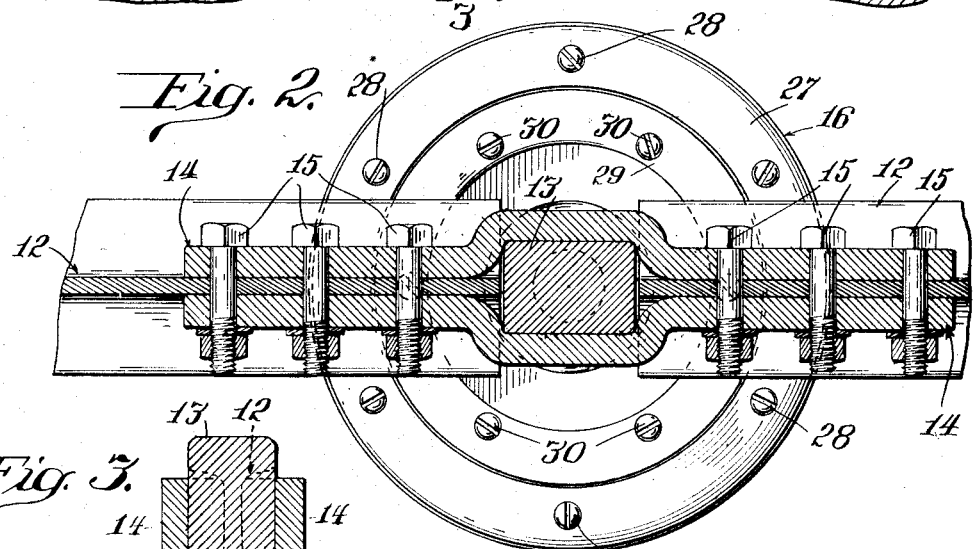
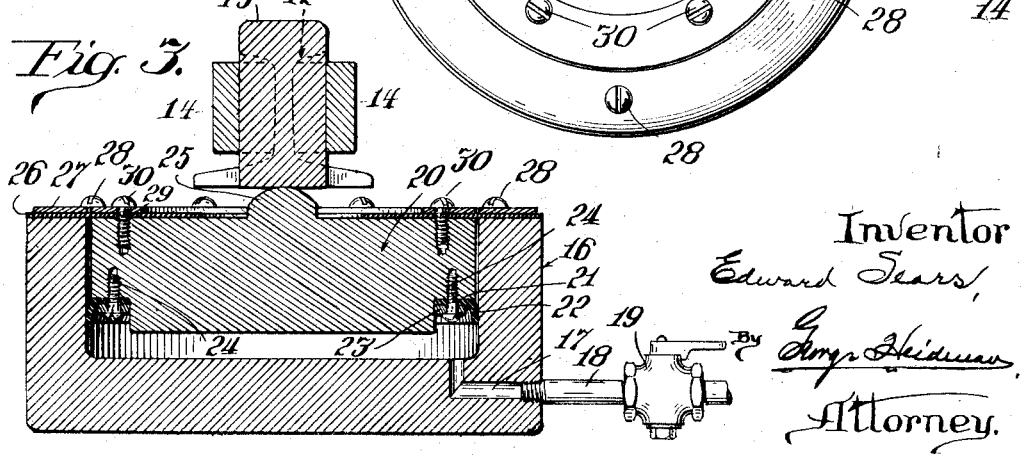
Inventor
Edward Sears,
By George Heidman
Attorney.

Patented July 5, 1932

1,865,446

UNITED STATES PATENT OFFICE

EDWARD SEARS, OF DEER LODGE, MONTANA

WEIGHING DEVICE

Application filed October 30, 1930. Serial No. 492,194.

My device is especially intended for weighing locomotive drivers, although adapted to weighing the entire locomotive, or other equipment; the invention having for its object the provision of a comparatively simple construction which may be used as a compact dynamometer indicator as to the object weighed or pull or force to be recorded.

My invention has for its object the provision of a device which may readily be installed in conjunction with a track on which the locomotive may be run and the respective drivers or other parts of the locomotive brought into place on a movable or depressible element of the device.

The objects and advantages of my invention will be readily comprehended from the following detailed description of the accompanying drawing, wherein:—

Figure 1 is a side elevation of a track or rail section and my improved device installed and showing a segment of a locomotive drive-wheel in position.

Figure 2 is a longitudinal sectional view taken substantially on the line 2—2 of Figure 1 as viewed by the arrows.

Figure 3 is a vertical sectional view taken substantially on the line 3—3 of Figure 1.

The specific exemplification of my device, as set forth in the drawing, is especially intended for weighing parts of a locomotive, as for example the drivers of a locomotive and therefore a segment or portion of a locomotive drive wheel is shown at 10 in Figure 1.

Where the device is employed for the purpose mentioned, it is installed on a solid foundation of concrete, indicated at 11, or on any other solid base where the weight of the objects to be weighed so demands.

The device when used for locomotive driver weighing is installed adjacent to the track-rails which are shown at 12 or by cutting away a section of a rail. The rail sections are spaced apart a distance sufficient to provide proper clearance for a plunger member 13, without permitting sidewise movement thereof.

The plunger member is reciprocably held in place by the yoke members or metallic straps 14, 14, one on each side of the plunger member, whose ends are rigidly secured to the webs of the rails in any suitable manner, as for example by the bolts 15.

It is apparent from Figure 2 that the yoke members 14, 14 and the rail sections 12, 12 provide a housing whereby the plunger member is held in upright position while being free to reciprocate or to move downwardly by superposed locomotive drivers, as shown in Figure 1.

The device comprises a suitable cylinder or fluid holding member 16 which is mounted on a solid foundation beneath the rails. The bottom and side wall of the cylinder 16 is shown provided with a port 17 adapted to receive a suitable conduit or pipe 18,—preferably provided with a suitable valve as at 19,—and which pipe leads to a suitable gauge (not shown) calibrated to register or indicate the load in pounds or in square inches pressure, as desired. The cylinder is intended to be supplied with an incompressible fluid such as oil, in a sufficient quantity, as for example a half inch thickness or depth of oil in the cylinder as here illustrated.

The cylinder 16 is provided with a piston 20 of diameter slightly less than the bore of the cylinder so as to provide just sufficient clearance, as for example three thousandths of an inch; and the bottom of the piston 20 is shown with a cut-away portion to provide an annular inset shoulder 21 slightly removed from the lower end of the piston.

This shoulder is intended to provide a suitable seat for a gasket 22, preferably of brake cylinder packing leather.

The gasket is, of course, of larger diameter than the diameter of the bore of the cylinder 16 in order that it may be in contact with the wall of the cylinder and thus effect a substantially fluid-tight relation between the piston and the cylinder to prevent escape of the oil which is in the bottom of the cylinder.

The gasket is secured to the piston and held in place in any suitable manner, as for example by a flat ring 23, which is secured to the piston by the screws 24.

The top of the piston 20 is shown centrally provided with an arcuate boss or pivot providing enlargement 25. The enlargement 25, which may be secured to the piston 20 in any suitable manner or integrally formed therewith, is preferably formed arcuate as shown and has the plunger member 13 rest thereon.

With the construction as shown and heretofore described, it is apparent that when locomotive drivers are run along the rails 12 until they are disposed on the plunger member 13, the latter will be depressed from its normal elevated position, thereby causing the piston 20 to be depressed which places the oil under pressure, inducing the oil in the connected conduit or pipe 18 to actuate a suitable gauge whereby the load on the plunger member 13 may be determined.

It will be understood that a similar device is installed in the companion rail of the track at a directly opposite point so that both driving wheels of a pair may be simultaneously positioned on the respective plunger members.

The oil outlet conduits 18 of both devices may be united to a single pipe leading to a single gauge; or a separate gauge may be employed, as desired.

The plunger 13 is of diameter sufficient to receive the entire contacting or traction affording segmental arc of the wheel as shown in Figure 1, in order that the entire weight of the drivers may be brought to rest on the plungers 13.

With the exemplification of the invention as disclosed in the drawing being especially adapted for weighing the respective parts or drivers of a locomotive and therefore an installation which is subject more or less to rain and dirt, I provide a rubber or other flexible gasket 26 of diameter sufficient to lap both cylinder 16 and the piston 20, in order to prevent entrance of grit, dirt and rain between the wall of the cylinder and the piston. The gasket 26 is shown secured to the cylinder 16 by means of a flat ring 27 secured in place by screws 28 and secured to fit about the plunger fulcrum point or boss 25 and is secured to the piston by ring 29 and screws 30.

The gasket 26 is of such flexibility and size as not to interfere with the free action of the piston 20. Of course, where the device is intended for more accurate weighing and where the device is installed under conditions not subjected to dirt and rain, the gasket 26 is omitted.

It is apparent that with the gasket 22 at the lower end of the piston 20, escape of the oil between the piston and cylinder wall is prevented; and where the device is intended for the purpose of determining the weight of locomotive parts or locomotive drivers, the cylinder is set on a solid immovable foundation as described and the ends of the rails rest on the cylinder wall and the load from the drivers transferred through the plunger 13 by means of pivot point 25 and piston 20 to the oil in the cylinder cavity. The load is therefore registered by the oil pressure on a suitable gauge, either in square inches pressure, or in pounds, as the gauge may be calibrated.

With my improved device, which is comparatively simple and easily installed, it is possible to ascertain the weights of locomotive drivers, as well as other parts of the locomotive; it being apparent that when desired a series of these units may be properly installed so that the various pairs of wheels of a locomotive will be simultaneously positioned on a plunger and reading of the respective gauges or of a master gauge may be made.

I have illustrated a specific exemplification of my invention which has been described in terms employed merely as terms of description and not as terms of limitation, as structural modifications are possible and may be made without, however, departing from the spirit of my invention.

What I claim is:

1. A device of the character described, in combination with track-rail sections, a cylinder, arranged beneath the sections, adapted to hold an incompressible fluid, the lower end of the cylinder having a conduit leading therefrom and to a registering gauge; a piston arranged in the cylinder on said fluid while the top of the piston is provided with an arcuate boss; means at the lower end of the piston whereby escape of the fluid between the piston and cylinder wall is prevented; a plunger member reciprocably mounted between the aligned rail sections with the lower end bearing on said arcuate boss on the piston; and a pair of straps secured to opposite sides of the rail sections whereby the plunger member is reciprocatingly held in upright position.

2. A device of the character described comprising a fluid holding cylinder provided at the bottom with a conduit adapted to be connected with a load registering gauge; a piston in said cylinder; means secured to the piston for preventing escape of the fluid upwardly between the piston and side wall of the cylinder; in combination with track rails disposed above the cylinder and arranged to provide a spacing between the adjacent rails, above the piston; a piston actuating extension arranged in the spacing between the aligned rails and adapted to have the object to be weighed disposed thereon; and means adapted to be secured to the aligned rails for reciprocatingly holding said extension in place.

3. A device of the character described comprising, in combination with aligned track rails arranged to provide a socket therebetween, a fluid holding cylinder arranged beneath said rails and having a conduit leading from the lower end of the cylinder to a load registering gauge; a piston in the cylinder; a gasket removably secured to the lower end of the piston in fluid tight relation with the inner wall of the cylinder to prevent upward escape of the fluid; a plunger member disposed in the socket of the track rails with the lower end thereof bearing on said piston; and plunger guide members secured to opposite sides of the track rails.

4. In combination with track rails arranged to provide a vertical socket between the aligned rail sections; a fluid holding cylinder provided at bottom with a fluid receiving conduit adapted to be connected to a load registering gauge; a piston in the cylinder above the fluid; means whereby escape of the fluid between the piston and cylinder side wall is prevented; and a plunger member reciprocably mounted in the socket of the track rails on which the object to be weighed is superposed.

EDWARD SEARS.